Figure 1:
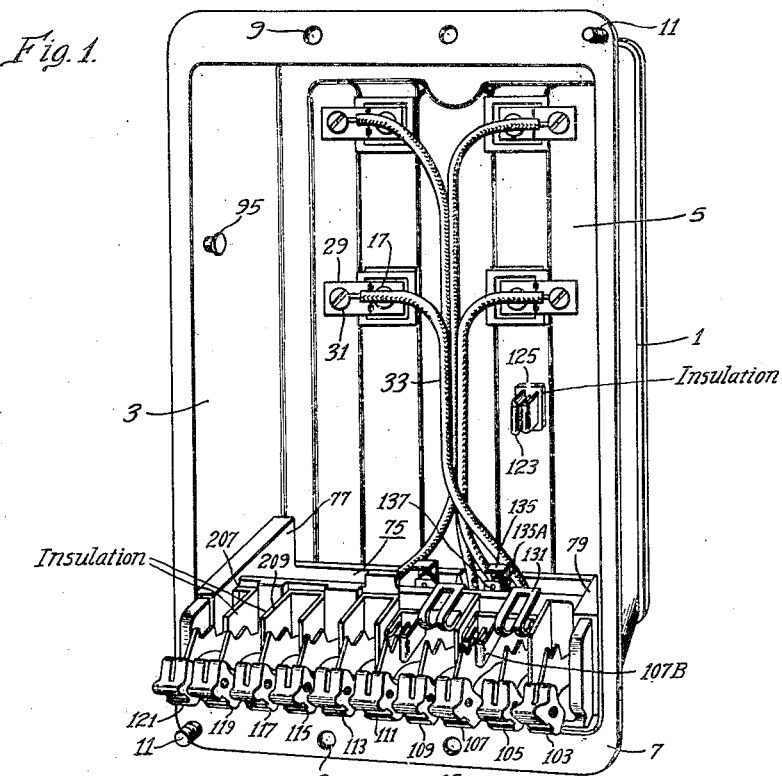

Nov. 13, 1945.  J. F. CHAPMAN ET AL  2,388,675
ELECTRICAL INSTRUMENT MOUNTING
Filed April 20, 1943   6 Sheets-Sheet 1

INVENTORS
James F. Chapman
and Kolman Riesz.
BY
C. L. Freedman
ATTORNEY

Nov. 13, 1945.  J. F. CHAPMAN ET AL  2,388,675
ELECTRICAL INSTRUMENT MOUNTING
Filed April 20, 1943   6 Sheets-Sheet 2
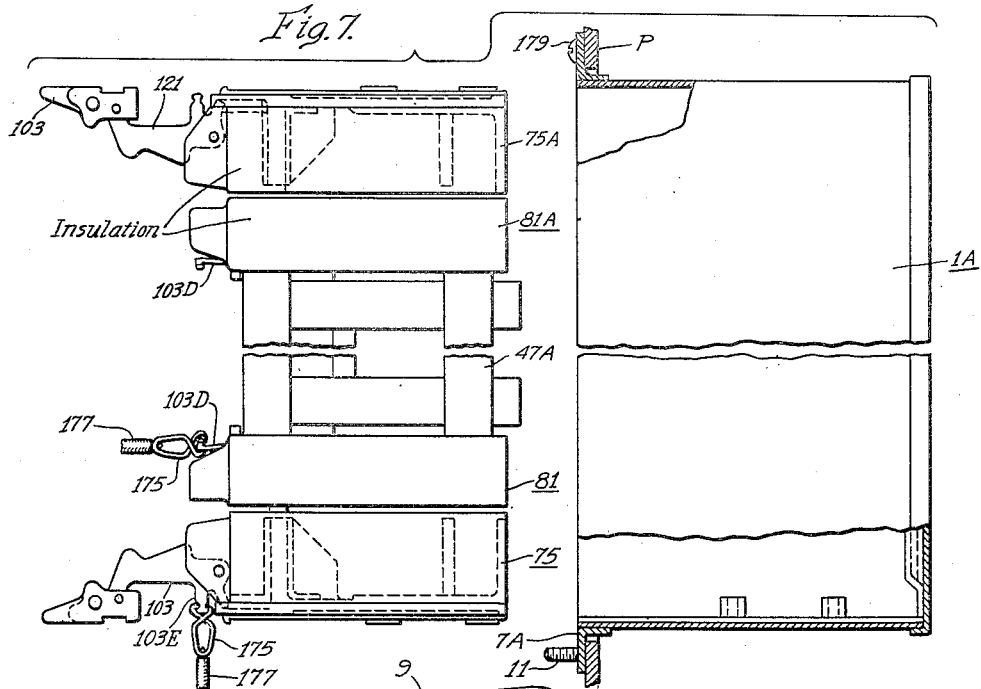
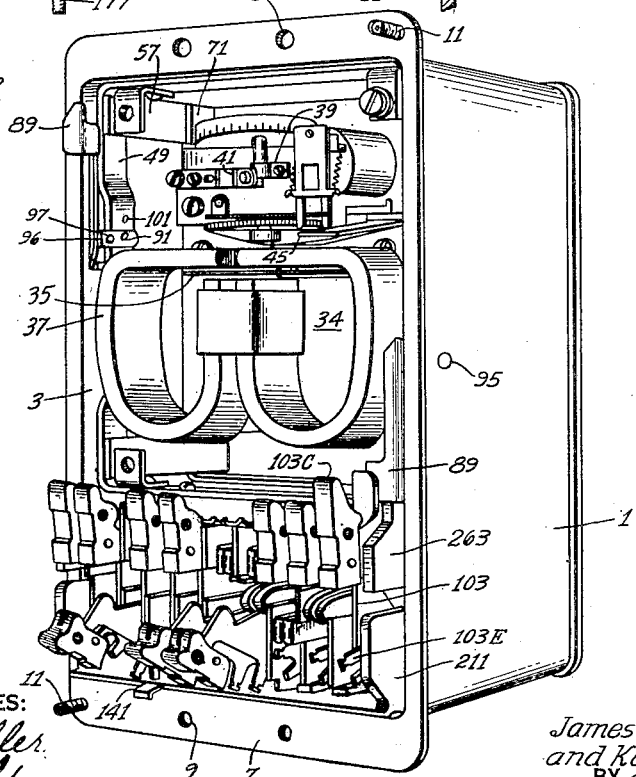
INVENTORS
James F. Chapman
and Kolman Riesz.
BY
ATTORNEY Nov. 13, 1945.    J. F. CHAPMAN ET AL    2,388,675
ELECTRICAL INSTRUMENT MOUNTING
Filed April 20, 1943    6 Sheets-Sheet 3

INVENTORS
James F. Chapman
and Kolman Riesz.
BY
L. L. Freedman
ATTORNEY

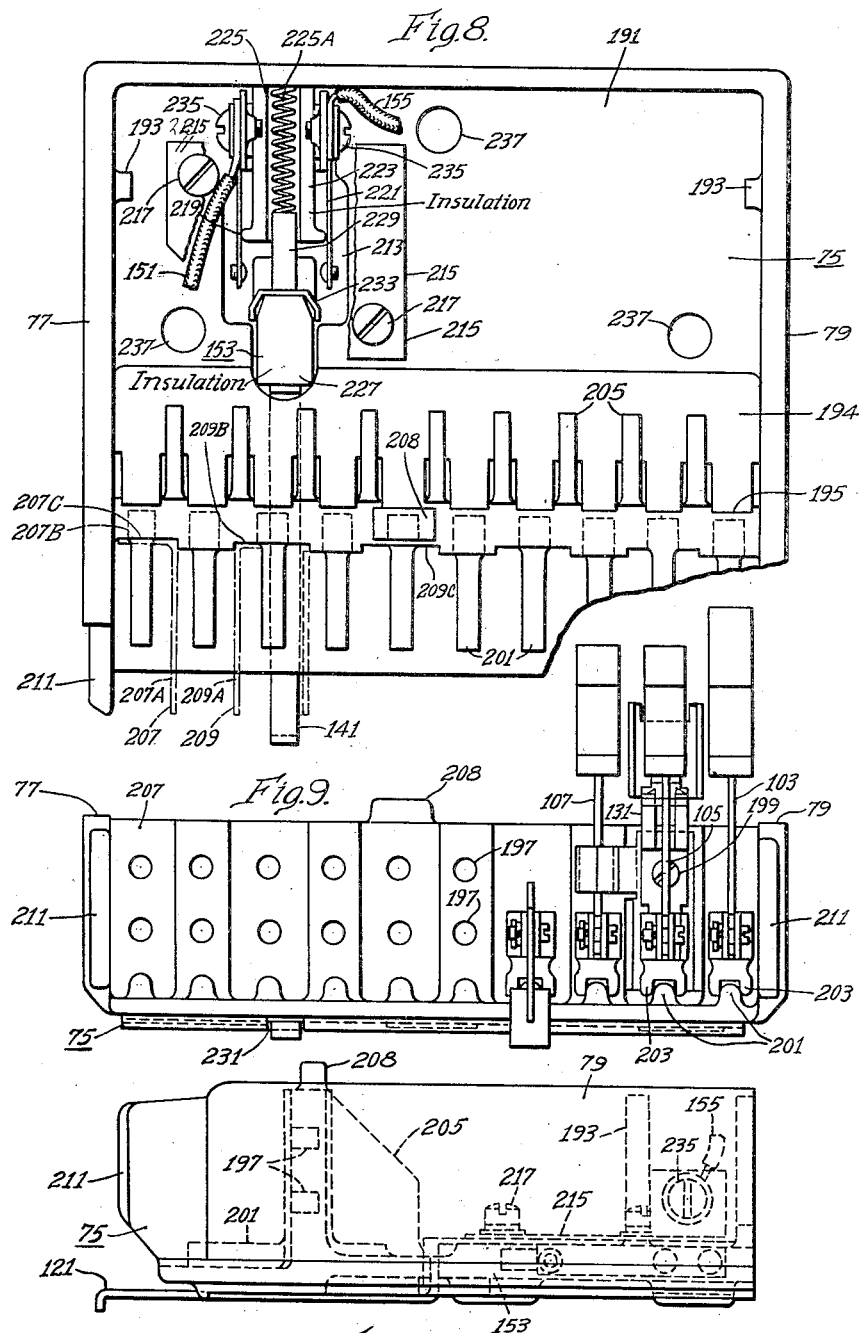

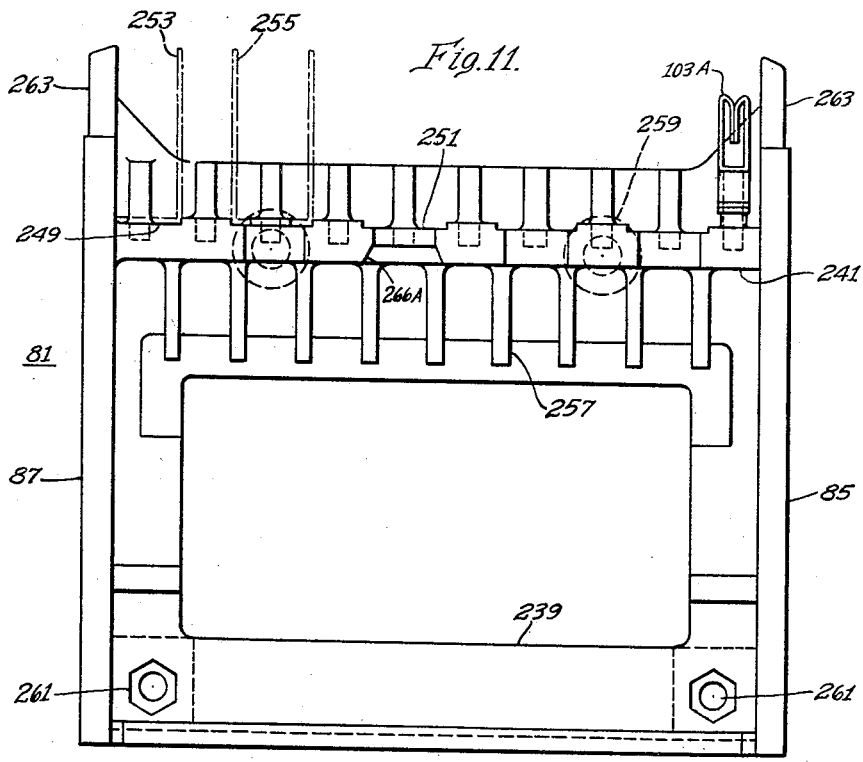
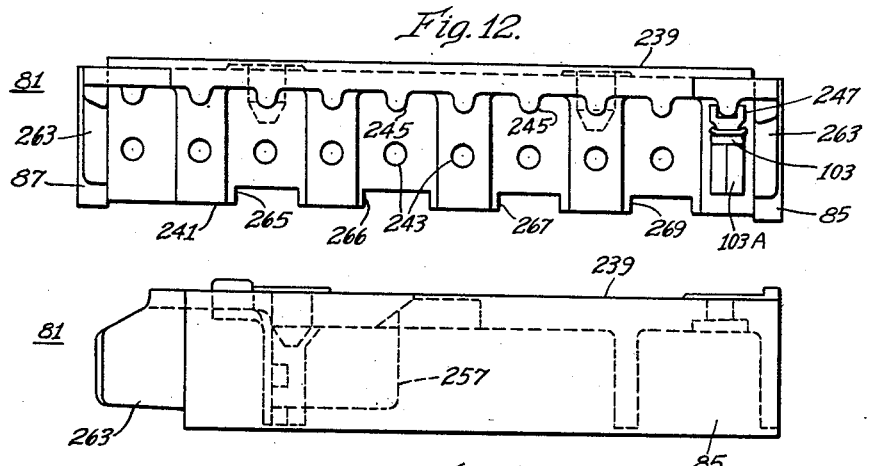

Nov. 13, 1945.    J. F. CHAPMAN ET AL.    2,388,675
ELECTRICAL INSTRUMENT MOUNTING
Filed April 20, 1943    6 Sheets-Sheet 6
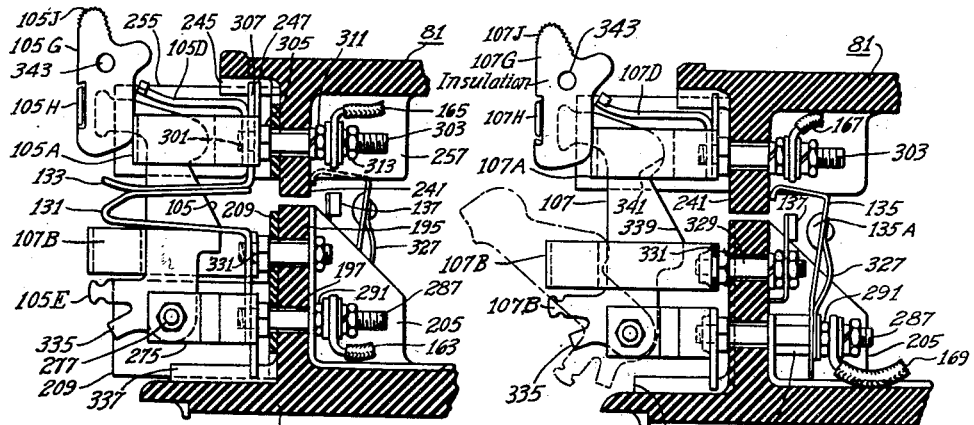
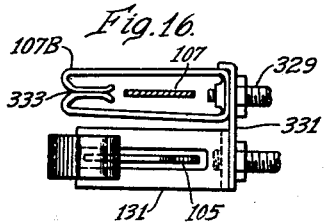
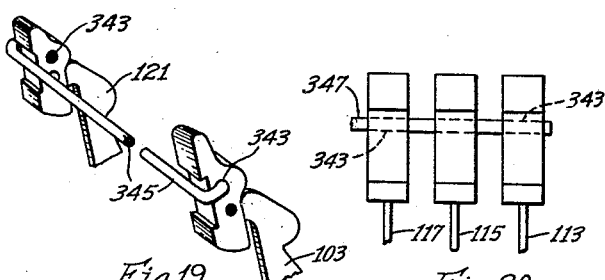
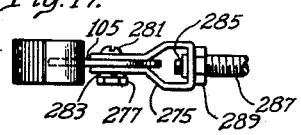
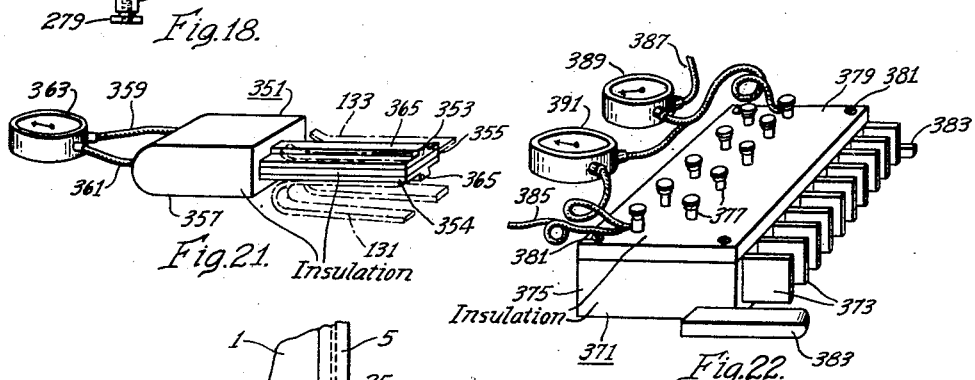
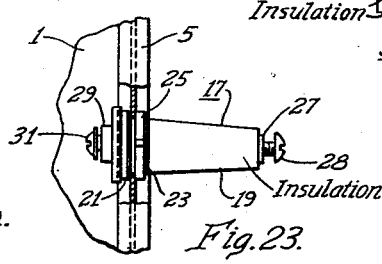
WITNESSES:
INVENTORS
James F. Chapman
and Kolman Riesz.
BY
ATTORNEY Patented Nov. 13, 1945

2,388,675

UNITED STATES PATENT OFFICE 2,388,675

ELECTRICAL INSTRUMENT MOUNTING

James F. Chapman, East Orange, and Kolman Riesz, Gillette, N. J., assignors to Westinghouse Electric Corporation, East Pittsburgh, Pa., a corporation of Pennsylvania Application April 20, 1943, Serial No. 483,730

23 Claims. (Cl. 175—307)

This invention relates to electrical apparatus, and it has particular relation to electrical apparatus including a structure for supporting an electrical device or instrument in operative position and for permitting ready withdrawal of the electrical device or instrument from operative position.

In the prior art, it has often been found convenient to mount an electrical device or instrument detachably on a supporting structure. Such mounting is particularly desirable for electrical devices or instruments such as integrating instruments, indicating instruments, recording instruments and relays which are flush mounted on a supporting structure such as a switchboard or panel. When an instrument is flush mounted on a switchboard or panel, the instrument movement is located substantially towards the rear of the switchboard or panel and consequently is in a position relatively inaccessible for inspection and servicing. For this reason, it is desirable to so mount the instrument that it may be removed readily for inspection and servicing. Examples of prior art detachable mountings for electrical instruments are shown in the West et al. Patent 2,286,044 and the Smith et al. Patent 2,254,920.

In accordance with the invention, an improved supporting structure is provided for a detachable electrical instrument. This supporting structure includes a casing having a detachable cover. The casing is proportioned to receive an electrical instrument. In order to permit ready removal of the electrical instrument from the casing, switch means are provided including parts carried by the instrument and parts on the casing. By actuation of the switch means, conductors secured to the casing and conductors secured to the instrument may be mechanically and electrically connected and disconnected. When the switch means is in disconnected condition, the electrical instrument may be removed readily from the associated casing.

Preferably the switch means takes the form of a knife switch having a contact jaw positioned on one of the relatively movable parts, such as the instrument, and having a knife blade pivotally secured to the remaining part, such as the casing, for rotation into and out of engagement with the associated contact jaw when the instrument is in operative position within the casing.

If a plurality of separate switches are required these switches may have their knife blades connected for rotation as a unit into and out of engagement with their respective contact jaws. For maximum flexibility, however, the switches may be arranged for independent operation.

Certain electrical instruments, such as relays, are subject to false operation resulting from shock or vibration. To prevent such operation during attachment or withdrawal of the relay with respect to its casing, the invention further contemplates interlocking means for rendering the relay ineffective for a control operation before the relay can be moved to or from its operative position.

Instruments often include circuits which must be retained in a predetermined condition. For example, instruments often require current transformers which should never be open circuited. In accordance with a further aspect of the invention, means are provided for maintaining the required condition of such electrical circuits despite movements of the instrument with respect to its casing. The invention also contemplates the provision of terminals accessible from the front of the instrument and its associated casing for receiving electrical connections required to test or check the instrument. For further convenience in testing, a jack is provided having parts carried by the instrument and parts carried by the casing. These parts are in operative condition when the instrument is in operative position with respect to its casing. Because of the two-part construction of the jack, the jack does not impede desired movements of the instrument with respect to its casing.

It is, therefore, an object of the invention to provide an improved electrical assembly including supporting means for detachably supporting an electrical instrument.

It is a further object of the invention to provide an improved electrical assembly including a supporting structure for detachably supporting an electrical instrument and including switch means having parts on the supporting structure and parts on the electrical instrument for detachably connecting conductors positioned on the supporting structure and conductors positioned on the electrical instrument.

It is an additional object of the invention to provide an improved electrical assembly including supporting means for detachably supporting an electrical instrument and including switch means having parts on the supporting structure and parts on the electrical instrument, the switch means being designed for actuation when the electrical instrument is in operative position with respect to its supporting structure.

It is another object of the invention to provide an improved electrical assembly including a supporting structure for detachably supporting an electrical instrument and including a knife switch wherein the contact jaw of the knife switch is positioned on the electrical instrument and the knife blade of the switch is pivotally secured to the supporting structure for rotation into and out of engagement with the associated contact jaw when the electrical instrument is in operative position with respect to its supporting structure.

It is a still further object of the invention to provide an electrical assembly including a supporting structure for detachably supporting an electrical instrument and including a plurality of independently operable knife switches having parts positioned on the supporting structure, and parts positioned on the electrical instrument for controlling the connection between conductors located on the electrical instrument and conductors located on the supporting structure.

It is also an object of the invention to provide an improved electrical system including a supporting structure for detachably supporting an electrical instrument with interlocking means for preventing movement of the electrical instrument with respect to its supporting structure from modifying a desired condition of electrical circuits associated with the electrical assembly.

It is a further object of the invention to provide an improved electrical assembly including a supporting structure for detachably supporting an electrical instrument with a jack having parts positioned on the supporting structure and parts positioned on the electrical instrument, the jack being arranged to permit insertion of a jack plug when the instrument is in operative position with respect to its supporting structure.

It is another object of the invention to provide an improved electrical assembly including a supporting structure for detachably supporting an electrical instrument with terminals on the supporting structure, and terminals on the electrical instrument which are accessible from the front of the electrical instrument when it is in operative position with respect to the supporting structure.

Figure 2:
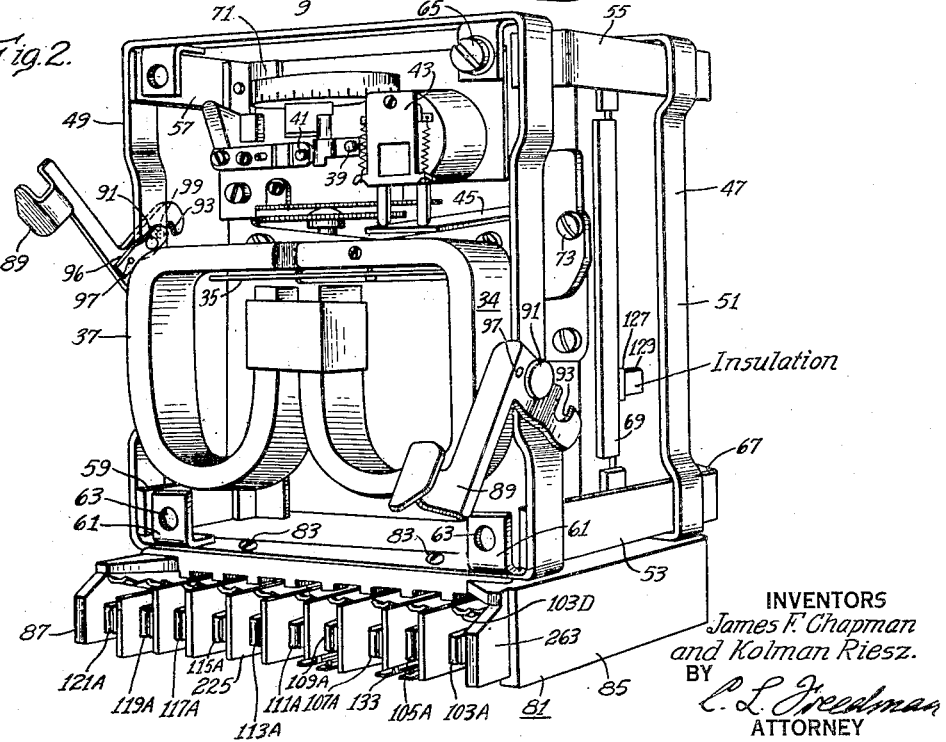
Figure 4:
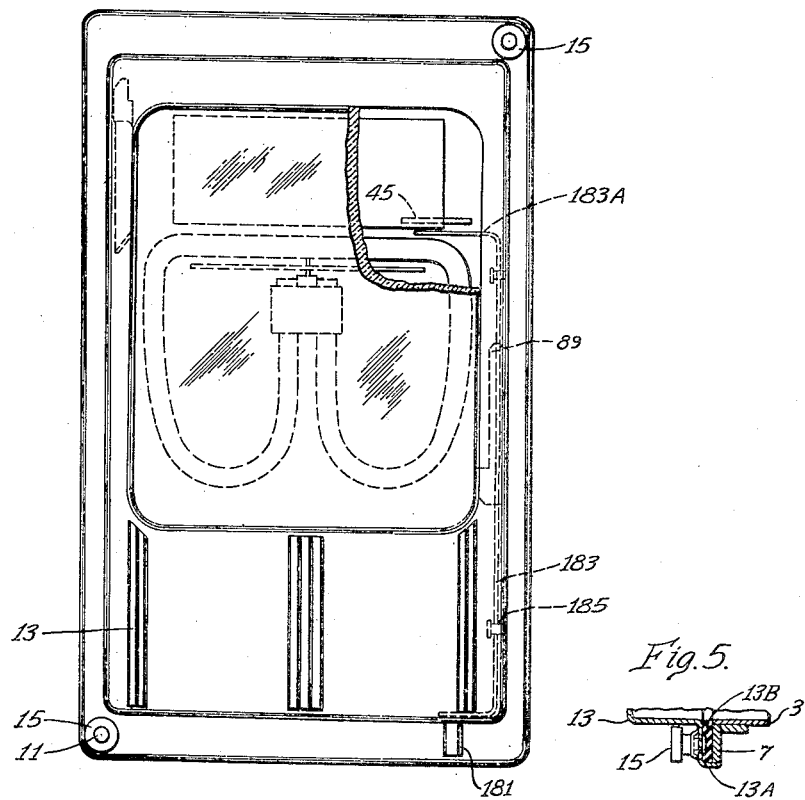
Figure 5:
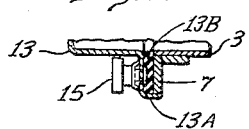
Figure 6:
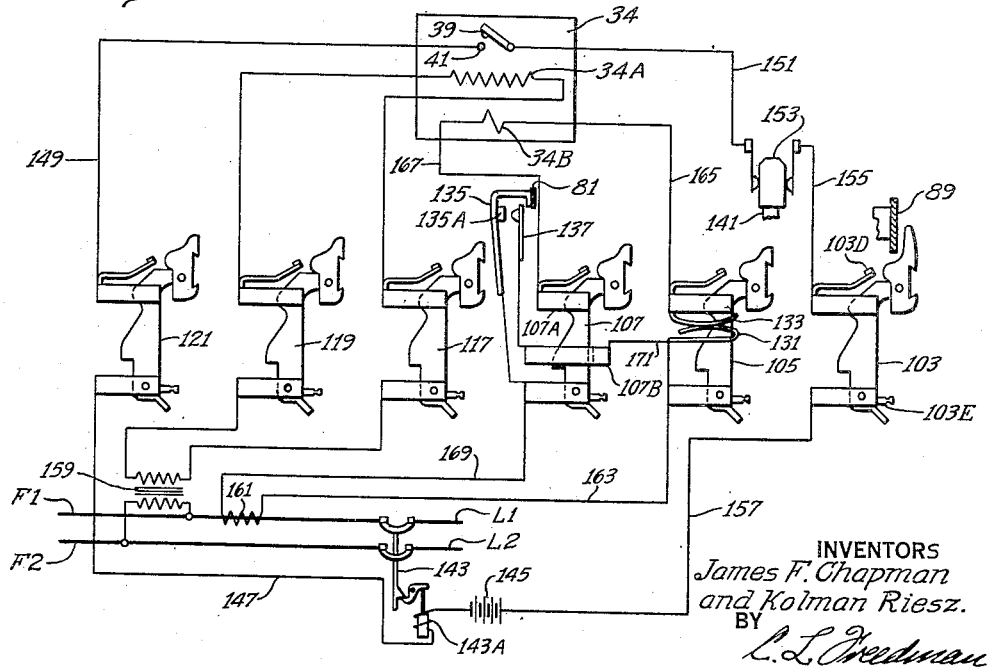

Other objects of the invention will be apparent from the following description taken in conjunction with the accompanying drawings, in which:

Figure 1 is a view in front perspective of a casing for an electrical instrument embodying the invention, Fig. 2 is a view in front perspective of an electrical instrument suitable for insertion in the casing of Fig. 1, Fig. 3 is a view in front perspective showing the electrical instrument of Fig. 2 inserted in the casing of Fig. 1, Fig. 4 is a view in front elevation of the instrument and casing assembly of Fig. 3 showing a cover in position over the front of the casing, Fig. 5 is a detail view in cross section of a portion of the cover illustrated in Fig. 4, Fig. 6 is a schematic view showing circuit connections suitable for the electrical instrument and casing of Fig. 3, Fig. 7 is an exploded view in side elevation with parts in cross section showing a modified form of the invention, Fig. 8 is a view in top plan of a base insulating member suitable for the casing of Fig. 1, Fig. 9 is a view in front elevation of the base insulating member of Fig. 8 with electrical switches added, Fig. 10 is a view in side elevation of the base insulating member of Fig. 8, Fig. 11 is a view in bottom plan of an insulating member suitable for the electrical instrument of Fig. 2, Figs. 12 and 13 are respectively front and side views in elevation of the insulating member shown in Fig. 11, Figs. 14 and 15 are detail views with parts in section showing switch assemblies employed in the electrical instrument and casing assembly of Fig. 3, Fig. 16 is a detail view in top plan showing portions of the switch assembly illustrated in Fig. 14, Fig. 17 is a detail view in top plan of a knife blade switch unit suitable for the casing illustrated in Fig. 1, Fig. 18 is a detail view of a bushing employed in the knife blade assembly of Fig. 17, Fig. 19 is a detail view in perspective showing an interlocking arrangement for certain of the switch handles which may be employed in the casing of Fig. 1, Fig. 20 is a detail view in front elevation showing a modified form of interlocking for the switch handles, Fig. 21 is a view in perspective of a jack plug suitable for use with the assembly of Fig. 3, Fig. 22 is a view in perspective of a test plug which may be employed for testing the electrical instrument of Fig. 2, and Fig. 23 is a detail view in side elevation with parts broken away of a terminal suitable for the casing of Fig. 1.

Referring to the drawings, Fig. 1 shows a portion of a supporting structure in the form of a casing 1 which is formed of a continuous wall 3 having a back closure 5 secured thereto. The front of the casing 1 is provided with a flange 7 having openings 9 therein through which screws may be inserted for the purpose of attaching the casing to a suitable supporting member such as a panel or switchboard. The flange also carries stud screws 11 to which a cover 13 (see Fig. 4) may be secured by means of suitable nuts 15. The wall 3, the back closure 5 and the front flange 7 may be secured to each other in any suitable manner as by welding.

In order to connect conductors positioned within the casing 1 to conductors located outside of the casing 1, a plurality of terminals 17 pass through openings in the back closure of the casing. These terminals may take the form illustrated more fully in Fig. 23. As shown in Fig. 23, the terminal includes a bushing 19 which may be formed of insulating material such as a phenolic resin. This bushing has a head 21 positioned on a first base of the back closure 5. The bushing also is provided with a peripheral groove 23 in which a resilient split locking ring 25 is seated. The head 21 and the locking ring 25 serve to secure the bushing 19 to the back closure 5. A conductive member 27 having internal threads at its outer end passes through the bushing 19 and is attached to a conductive plate 29 positioned interiorly of the casing 1. The plate 29 has a threaded opening for reception of a connecting screw 31. As shown in Fig. 1, conductors 33 within the casing 1 may be secured to the plates 29 by means of the screws 31. An external conductor may be connected to the conductive member 27 by means of a machine screw 28.

The casing of Fig. 1 is proportioned to receive an electrical instrument of any suitable type such as that illustrated in Fig. 2. The specific instrument selected for the purpose of illustration is a conventional electrical relay. To assist in orienting the relay which is of the induction type, attention may be directed to the induction disk armature 35 which rotates in the air gap of a damping magnet 37. The shaft on which the armature 35 is mounted carries a movable electrical contact 39 which is rotatable by the armature into engagement with a fixed electrical contact 41 to complete a control circuit when the relay is suitably energized. An operation indicator 43 having a resetting plate 45 also is illustrated.

In Fig. 2, the electrical relay 34 is secured within a suitable frame or chassis 47. Although the chassis may completely enclose the relay, if desired, a complete enclosure generally is not required for the reason that the relay is intended to be enclosed within the casing 1 of Fig. 1. For this reason, a skeleton chassis 47 is employed which includes two continuous metal straps 49 and 51 of generally rectangular outline. These straps are connected at spaced intervals by means of connecting strips 53, 55, 57 and 59. Legs 61 in the form of angle members may be formed from the strips or may be attached to the strap 49 and may project sufficiently towards the front of the assembly to provide a support for the electrical relay when the legs are placed in contact with a surface. These legs may be provided with openings 63 to which parts of the relay may be secured as by a bolt 65. In a somewhat analogous manner, the rear ends of the strips 53, 55, 57, and 59 may be turned inwardly to provide four feet 67 which may be placed in contact with a supporting surface to support the electrical relay. With this construction any face of the chassis may be placed in contact with a supporting structure for the purpose of supporting the electrical relay. The parts of the chassis may be formed of a metal such as steel and may be secured to each other in any suitable manner as by spot welding to form a rigid and sturdy structure.

The relay 34 may be secured to the chassis 47 in any suitable manner. In the specific embodiment of Fig. 2, a pair of angle irons 69 and 71 are secured, respectively, between the straps 53 and 55 and the straps 57 and 59. These angle irons are provided with slotted openings for the purpose of receiving machine screws 73. The machine screws 73 pass through openings in the structure of the relay 34 and have nuts (not shown) at their threaded ends for securing the relay to the angle irons 69 and 71 and thereby to the chassis 47.

To facilitate insertion and removal of the relay 34 with respect to the casing 1, it is desirable that the casing and the relay be provided with cooperating rails or guide surfaces. To this end the casing of Fig. 1 is provided with a base insulating member 75 having a pair of projecting ribs 77 and 79 which are located adjacent opposite sides of the casing 1. These ribs 77 and 79 may be termed rails or guide surfaces for guiding the relay 34 into and out of operative position with respect to the casing 1.

In a somewhat analogous manner, an insulating member 81 is secured to the chassis 47 (Fig. 2) in any suitable manner as by machine screws 83 which pass through openings in the strap 49 and which are received in threaded openings in the insulating member 81. The insulating member 81 has ribs 85 and 87 projecting therefrom to provide rails or guide surfaces cooperating with the rails 77 and 79 of the base insulating member 75.

When the relay 34 and its chassis 47 are inserted in the casing 1, the position of the chassis in the casing is determined by the engagement of the feet 67 (Fig. 2) with the back closure 5 of the casing of Fig. 1. The chassis is secured to the casing by means of latches 89 which are pivotally secured to the strap 49 by means of rivets 91. The strap 49 is recessed adjacent the rivets 91 to provide ample clearance between the latches and the casing 1 into which the chassis 47 is to be inserted. These latches are provided with notches 93 for receiving pins 95 projecting inwardly from the wall 3 of the casing 1. The latches 89 may be maintained in a desired position in any suitable manner as by means of a leaf spring 96 which is secured to each latch 89 by means of a rivet 97 and which is pivotally secured to the strap 49 by means of the rivet 91. The spring 96 at its outer end is provided with a slight depression 99 proportioned to enter an opening 101 (see Fig. 3) when the latch 89 is in its unlatched position. The unlatched position of the latch preferably is such that the cover 13 cannot be applied to the casing 1 until the latch 89 has returned to its latched condition.

In order to connect the windings and contacts of the relay 34 to the terminals 17 of the casing 1, a plurality of switches is provided which include parts on the insulating member 75 (Fig. 1) and parts on the insulating member 81 (Fig. 2). Because of their proved reliability, knife switches are employed for establishing the desired connections. To this end a plurality of knife blades 103, 105, 107, 109, 111, 113, 115, 117, 119 and 121 are pivotally secured to the base insulating member 75. Each of the knife blades is provided with a cooperating contact jaw mounted on the insulating member 81 for movement with the relay 34 relative to the casing 1. Each contact jaw is identified by the reference character of its cooperating knife blade to which the letter A has been affixed. By inspection of Figs. 1, 2 and 3, it will be observed that when the relay 34 is in operative position within the casing 1, each of the knife blades may be actuated into engagement with its associated contact jaw. Before the relay can be removed from its operative position, the knife blades must be actuated away from the associated contact jaws. If desired, the knife blades may be proportioned as shown to have portions in the path of attachment of the cover 13 when the knife blades are in open positions. Such a construction permits attachment of the cover only when the switch knife blades are in closed positions.

Each of the windings and contacts of the relay 34 is connected to one or more of the associated contact jaws. Therefore, closure of the associated knife blades establishes an electrical connection between the windings and contacts of the electrical relay and conductors 33 (Fig. 1) carried by the casing 1. Although ten knife switches are illustrated in Figs. 1, 2 and 3, it will be understood that the number of switches actually required depends on the particular relay or other instrument positioned within the chassis 47. If additional connections above ten are required between conductors associated with the relay 34 and conductors secured to the casing 1, one or more contact jaws 123 (Fig. 1) may be secured to an insulating bushing 125 which, in turn, is secured to the back closure 5 of the casing 1. The chassis 47 has secured thereto an insulating block 127 to which a contact blade 129 is secured (Fig. 2). When the chassis 47 and the relay 34 are inserted within the casing 1, the contact blade 129 enters the contact jaw 123 to establish a connection between a conductor connected to the contact 129 and a conductor secured to the contact jaw 123. The contact jaw 123 and blade 129 may be similar in construction and operation to the contact jaws and blades illustrated in the aforesaid patents. Since the connection between the contact blade 129 and the contact jaw 123 is not accessible with the relay in operative position, it is preferable that only those connections which do not require accessibility be effected through contact blades and jaws of this type.

When the instrument supported in the chassis 47 includes a current circuit, it is desirable that means be provided for testing or checking the current flowing in such a circuit. For this purpose a jack is provided, which includes a resilient blade 131 secured to the base insulating member 75 (Fig. 1) and a resilient blade 133 secured to the insulating member 81 (Fig. 2). These blades are so positioned that when the relay 34 is in operative position, the resilient blades 133 and 131 are in engagement. Therefore, if a current circuit is completed through these blades, a jack plug may be inserted therebetween for the purpose of connecting a current responsive instrument such as an ammeter in the current circuit. It will be observed that the resilient blades 131 and 133 are slotted to permit passage of the knife blade 105 into engagement with its associated contact jaw. In this engaged position of the knife blade 105, the knife blade establishes a circuit in parallel with the jack represented by the resilient blades 131 and 133. Consequently, under most operating conditions the reliable contact of the knife switch is relied on rather than the contact between the resilient blades 131 and 133 of the jack. It should be observed further that the switch knife blade 105 must be opened before a jack plug can be inserted effectively between the resilient blades 131 and 133. Such opening of the knife switch blade is required to open the parallel circuit established thereby across a jack represented by the resilient blades 131 and 133.

If the instrument supported by the chassis 47 and the casing 1 is energized in part from a current transformer, it is desirable that removal of the instrument should not open the circuit energized by the current transformer. To this end, one of the switches, such as that comprising the switch blade 107 and the contact jaw 107A, which is employed for completing the circuit across the secondary winding of the current transformer, is provided with a back contact 107B (Fig. 1) which is engaged by the knife blade of the switch as the knife blade is moved out of engagement with its associated contact jaw 107A. Engagement of the knife blade with its back contact 107B is employed for maintaining a circuit across the secondary winding of the associated current transformer.

If the chassis 47 and the instrument supported thereby are removed from the casing 1, there is a possibility that the switch knife blade 107 may be actuated out of engagement with its back contact 107B to open the circuit across the secondary of the associated current transformer. To prevent such opening, an auxiliary switch is provided having a resilient spring leaf 135 carrying a contact 135A which is biased into engagement with a fixed contact 137 (Fig. 1). These contacts are connected respectively to the knife blade 107 and the back contact 107B. The resilient spring leaf has a portion projecting into the path of movement of the chassis 47 as the chassis is inserted in the casing 1. Consequently, under normal operating conditions of the relay 34, the contacts carried by the spring leaf 135 and 137 are separated. When the relay 34 and its chassis 47 are removed from the casing 1, the spring leaf 135 urges its contact into engagement with the fixed contact 137 to establish a circuit across the secondary of the associated current transformer.

Certain electrical instruments are subject to false operation under the influence of shock or vibration. For example, certain sensitive relays when subjected to shock may complete a trip circuit to trip an associated circuit breaker. To prevent a false operation of the instrument which may result from shock or vibration to which the instrument is subjected during insertion of the instrument within the casing 1 or withdrawal of the instrument therefrom, interlocks are provided for maintaining the condition of the circuits which are subject to modification by shock. For example, in the case of the relay 34 the trip circuit of the relay is completed through the switch knife blade 103. This knife blade in its closed condition has a handle 103C which overlies the associated latch 89 (Fig. 3). Consequently, the latch 89 cannot be actuated to release the chassis 47 until the switch knife blade 103 has been actuated to open condition. With the switch knife blade 103 in open condition, a closure of the relay contacts cannot produce a false tripping operation of the associated circuit breaker. Preferably, the latch 89 in open condition has a portion in the path of operation of the knife blade to prevent closure of the knife blade 103. With such a relationship of the parts the knife blade 103 cannot be actuated to closed condition until the latch 89 has been actuated to secure the relay firmly in its operative position.

Although the interlocking of the switch knife blade 103 with the latch 89 requires opening of the relay trip circuit prior to withdrawal of the relay from its casing, it sometimes may be desirable to provide additional means for opening the trip circuit prior to withdrawal of the relay. Such means may take the form of an auxiliary switch having an operating push rod 141 (Fig. 3) which projects from the front of the casing 1 into the path of attachment of the casing cover. This push rod is biased towards the cover and when the cover is removed follows the cover for a distance sufficient to open the associated auxiliary switch. This auxiliary switch is connected in the trip circuit of the relay to open the trip circuit in response to removal of the cover.

As more particularly shown in Figs. 4 and 5, the cover 13 has a flange 13A which abuts the front flange 7 of the casing. The flange 13A has cemented or otherwise attached thereto a continuous gasket 13B which may be formed of a resilient material such as felt. The resiliency of this gasket suffices to accommodate the end of the push rod 141 (Fig. 3) which abuts thereagainst when the cover is attached to the casing.

To facilitate testing of the electrical circuits associated with the relay and its casing, it is desirable that each of the contact jaws and each of the associated knife blades of the knife switches be provided with a suitable terminal.

The terminal for each knife blade may take the form of a terminal lug which is identified by the reference character applied to the knife blade followed by the letter E. Such a terminal lug 103E is illustrated in Fig. 3. As shown in Fig. 2, each of the contact jaws may be provided with a terminal strip which is identified by the reference character applied to the associated knife blade to which the letter D is added.

With the construction and location of the parts in mind, it is believed that a brief description of a typical circuit embodying the invention will facilitate an understanding of the invention. Such a circuit is shown schematically in Fig. 6.

In Fig. 6 an electrical circuit is illustrated which includes feeder conductors F1 and F2 which are connected through a circuit interrupter 143 to load conductors L1 and L2. For the purpose of discussion, it will be assumed that the circuit represented by the feeder and load conductors is a single phase alternating-current circuit wherein the normal direction of power flow is from the feeder conductors to the load conductors. A tripping solenoid 143A is provided for tripping the circuit interrupter 143.

Tripping of the circuit interrupter 143 is controlled by the electrical relay 34. When the tripping contacts 39 and 41 of the relay 34 close, a tripping circuit is established for the tripping solenoid which may be traced from one terminal of a suitable source of electrical energy such as a battery 145, through the tripping solenoid 143A, a conductor 147, the switch knife blade 121, a conductor 149, the tripping contacts 41 and 39, a conductor 151, contacts of an auxiliary switch 153, a conductor 155, the switch knife blade 103 and a conductor 157 to the remaining terminals of the battery 145. When so energized the tripping solenoids trip the circuit interrupter to disconnect the load conductors L1 and L2 from the feeder conductors F1 and F2.

The auxiliary switch 153, as hereinafter described more fully, normally is biased to open condition and it is actuated to closed condition by the push rod 141 which is responsive to movement of the relay cover. When the relay cover is removed from its casing, the push rod 141 is released to permit an opening operation of the auxiliary switch 153.

For the purpose of discussion it is assumed that the relay 34 is a directional relay having a voltage winding 34A and a current winding 34B. The voltage winding 34A is energized from a voltage transformer 159 which has its primary winding connected across the conductors F1 and F2. The secondary winding of the voltage transformer is connected through the switch knife blades 117 and 119 to the voltage winding 34A.

Energization for the current winding 34B of the relay is derived from a current transformer 161 which is associated with the feeder conductor F1. The secondary winding of the current transformer is connected to the current winding 34B through a circuit which may be traced from one terminal of the secondary winding through a conductor 163, the switch knife blade 105, a conductor 165, the current winding 34B, a conductor 167, the switch knife blade 107 and a conductor 169 to the remaining terminal of the secondary winding. As well understood in the art, the directional relay 34 may be adjusted to retain its tripping contacts in open condition as long as power flows in the normal direction from the feeder conductors F1 and F2 towards the load conductors L1 and L2. Should the direction of power flow reverse from its normal direction, the directional relay 34 operates to close its tripping contacts and trip the circuit interrupter 143.

It will be observed that the jack represented by the blades 131 and 133 is connected between the conductors 163 and 165. If it is desired to check or measure the current supplied to the current winding 34B, the switch knife blade 105 may be actuated to open condition. A jack plug which is connected to a suitable check or measuring device such as an ammeter, may then be inserted between the blades 131 and 133 to connect the ammeter in series with the current winding 34B. After the current has been measured, the jack plug may be removed and the switch knife blade 105 may be reclosed. Consequently, the switch knife blade and its associated contact jaw are effective under normal operating conditions of the relay 34 to establish an excellent conductive path across the jack regardless of the condition of the jack blades. It will be observed further that the current circuit is opened at no time during the measuring operation.

With the parts initially in the conditions illustrated in Fig. 6, let it be assumed that the relay 34 is to be withdrawn from its casing. If the system includes the auxiliary switch 153, removal of the relay casing cover releases the auxiliary switch which opens to interrupt the tripping circuit of the relay. Consequently, vibration and shock thereafter applied to the relay 34 cannot initiate a false tripping operation of circuit interrupter 143.

Before the relay 34 can be released from its casing, the latch 89 must be actuated to released condition. Such actuation can be effected only if the switch knife blade 103 is moved to open condition. Since opening of the switch knife blade 103 further interrupts the tripping circuit of the relay 34, a false tripping operation of the circuit interrupter 143 cannot take place even though the auxiliary switch 153 is not provided.

Removal of the relay 34 from its casing also requires an opening of the switch knife blades 105, 107, 117, 119 and 121. As the switch knife blade 107 moves to open condition, it engages the back contact 107B to establish a short circuit across the terminals of the secondary of the current transformer 161. This short circuit may be traced from one terminal of the secondary through the conductor 163, a conductor 171, the back contact 107B, the switch knife blade 107 and the conductor 169 to the remaining terminal of the current transformer. Since the switch knife blade 107 engages its back contact 107B before it completely disengages from its contact jaw 107A, the secondary of the current transformer is not open circuited at any time.

Since the latch 89 is in released condition and since the switch knife blades are in open condition, the relay 34 may be removed from its casing. As the relay 34 is withdrawn from the casing, the blades 131 and 133 separate. However, such separation does not open the secondary circuit of the current transformer for the reason that this circuit is completed through the back contact 107B of the switch knife blade 107.

As the relay 34 is withdrawn, the resilient spring leaf 135 is released to permit engagement of the contact 135A carried thereby with the fixed contact 137. This establishes a short circuit across the secondary of the current transformer 161 which is independent of the switch knife blade 107. This circuit may be traced from one terminal of the secondary through the conductors 163 and 171, the back contact 107B, the fixed contact 137, the cooperating contact 135A and the conductor 169 to the remaining terminal of the secondary. Consequently, after withdrawal of the relay, the switch blade 107 may be released from its back contact 107B without open circuiting the secondary of the current transformer.

Before the relay can be reinserted in its casing, the switch knife blades must be in open condition. Insertion of the relay actuates the contact 135A away from the fixed contact 137. However, since the switch knife blade 107 must be in engagement with its back contact 107B, the separation of the contacts 135A and 137 does not open circuit the secondary of the current transformer 161. With the relay in its casing, the switch knife blades may be operated to closed condition. However, it should be observed that the switch knife blade 103 cannot be operated to closed condition unless the associated latch 89 is in latching position to secure the relay 34 firmly in its casing. It should be observed further that insertion of the relay in its casing automatically reengages the blades 131 and 133. Since the switch knife blade 107 engages its contact jaw 107A prior to its complete separation from the back contact 107B, the secondary of the current transformer 161 is not open circuited during such operation of the switch knife blade.

As a final step, the cover for the casing may be attached thereto. Such attachment operates the push rod 141 to close the auxiliary switch 153. The closure of the auxiliary switch restores the control of the circuit interrupter 143 to the relay 34.

When the switch knife blades are in open condition, the circuits of the relay 34 and the circuits associated with the knife blades may be tested by clipping suitable connections on the terminal lugs such as the terminal lug 103E and the terminal strips, such as the terminal strip 103D. Since the cover of the relay is removed under these circumstances, the auxiliary switch 153 may be manually closed if a test is to be made of the tripping circuit.

Although ten switch knife blades are illustrated in Figs. 1 and 3, only six of these knife blades are employed in the circuit of Fig. 6. The number of switch knife blades employed depends on the number of circuits required for the relay 34. Since only one current winding and one voltage winding are employed in the specific relay under consideration, only one pair of current switch knife blades and one pair of voltage switch knife blades are required.

If a relay is employed requiring an extremely large number of circuit connections, the modification illustrated in Fig. 7 may be employed. In Fig. 7, a chassis 47A is disclosed for reception of a relay. This chassis is similar to the chassis 47 of Fig. 2 with the exception that it may vary in size. At its lower end the chassis 47A is secured to the insulating member 81. An additional insulating member 81A is secured to the upper end of the chassis 47A. The insulating member 81A may be exactly similar to the insulating member 81 but is in inverted position.

The insulating member 81 cooperates with the base insulating member 75 which is secured to the casing, but which is illustrated as detached from its associated casing. The casing 1A is similar to the casing 1 of Fig. 1 except that it may vary in size to accommodate the relay 47A and associated insulating members. It will be understood that in normal operation the base insulating member 75 is positioned within the casing 1A and is attached to the lower end thereof in a manner similar to that illustrated in Fig. 1.

A second insulating member 75A is provided which may be exactly similar to the base insulating member 75 but which is in inverted position. The base insulating member 75A is positioned within the casing 1A and is attached to the upper end thereof for cooperation with the insulating member 81A. When the base insulating members 75A and 75 are in attached positions within the casing 1A, the chassis 47A with its insulating members 81 and 81A may be inserted in the casing 1A between the base insulating members 75 and 75A. After such insertion the latches carried by the chassis 47A (not shown in Fig. 7) may be operated to secure the chassis 47A firmly in the casing 1A. After such operation of the latches, the switch knife blades on the insulating members 75 and 75A may be actuated to engage the cooperating contact jaws respectively on the associated insulating members 81 and 81A.

As explained with reference to Figs. 1 to 3, the switch knife blade 103 carried by the insulating member 75 in closed position overlies the associated latch 89. In a similar manner, the switch knife blade 103 carried by the base insulating member 75A of Fig. 7 may overlie the second of the latches 89 associated with the chassis 47A. With such an arrangement complete release of the chassis 47A requires initial opening of both of the switch knife blades 103 associated with the base insulating members 75 and 75A. If a relay positioned within the chassis 47A has two tripping or control circuits, one of the tripping or control circuits may be completed through each of the switch knife blades 103. With such an arrangement both of the tripping or control circuits must be opened by actuation of the switch knife blades 103 before the relay can be released from the casing 1A.

Fig. 7 also illustrates the application of clips 175 to the terminal strips such as the terminal strip 103D and a terminal lug, such as the terminal lug 103E. These clips may be connected through suitable conductors 177 to measuring or testing devices for suitably testing one or more of the circuits associated with the relay mounted in the chassis 47A or the casing.

The casing thus far described may be mounted on an auxiliary supporting structure in any suitable manner. As illustrated in Fig. 7, the casing is mounted on a switchboard panel P. This panel is provided with an opening sufficiently large to permit passage of the casing 1A therethrough from the front of the panel until the front flange 7A of the casing engages the panel P. The casing 1A may be secured to the panel by means of machine screws 179 which pass through openings in the front flange 7A and which are received in threaded openings in the panel P.

Some electrical instruments require operations to be effected from a position exterior to their casings. For example, in Fig. 2 the operation indicator 43 may require resetting from the exterior of the associated casing. Such resetting may be effected by means of a pin 181 which projects through the cover 13 illustrated in Fig. 4. At its interior end the pin 181 is secured to a strap 183 which is guided for vertical movement by means of pins 185 secured to the cover 13. The strap 183 has a portion 183A bent to underlie the resetting plate 45 of the operation indicator. Consequently, operation of the pin 181 in an upward direction raises the resetting plate 45 to reset the associated operation indicator.

The base insulating member 75 (Fig. 1) may be constructed in various ways. As shown in Figs. 8, 9 and 10 more clearly the base insulating member 75 may have a base 191 from which the rails 77 and 79 project. If desired, ribs 193 may be provided at intervals for reinforcing the rails 77 and 79. The base 191 has a raised portion 194 across which a wall 195 extends to connect the rails 77 and 79. The wall 195 has openings 197 through which bolts 199 may extend for the purpose of connecting thereto the switch knife blades, three of which are illustrated in Fig. 9. Also bolts 199 may extend through certain of the openings for the purpose of attaching thereto the resilient blade 131 which forms one element of a jack. To retain the switch knife blades more firmly in desired positions, the base insulating member may be provided with ribs or keys 201 which are received in forked elements 203 secured to the pivot supports for the switch knife blades. A plurality of partitions 205 extend rearwardly from the wall 195 and serve to space conductors connected to the switch knife blades. The wall 195 also may include a projecting tongue 208 which assists in aligning the base insulating member with respect to the insulating member 81.

It is desirable that insulating partitions extend also between the switch knife blades. Such partitions may be molded together with the remainder of the base insulating member integrally from a suitable insulating material such as a phenolic resin. In the specific embodiment herein illustrated separate L-shaped barriers 207 and U-shaped barriers 209 are secured to the wall 195 by the bolts which secure the switch knife blades thereto. These barriers may be formed of a suitable insulating fiber and have arms 207A and 209A extended between adjacent switch knife blades. The barriers have webs 207B and 209B positioned in slots 207C and 209C formed in the wall 195. These webs have openings aligned with the openings 197 to permit attachment of the barriers to the wall by means of bolts passing through the aligned openings.

By inspection of Figs. 8, 9 and 10, it will be observed that the front ends of the rails 77 and 75 terminate in ears 211 of reduced thickness and height. As hereinafter pointed out, these ears are employed for guiding purposes.

The base 191 is provided with an opening 213 for receiving the auxiliary switch 153. The auxiliary switch may have parts positioned beneath, and retained by, a plate 215 of insulating material which is secured to the base 191 by means of machine screws 217 or other suitable means. The switch 153 includes a pair of spaced spring arms 219 and 221 which are biased into engagement with a spacer 223 formed of insulating material. The spacer 223 also contains a channel 225 for receiving and positioning a coil spring 225A. A plunger 227 formed of insulating material has a pin 229 movable in the channel 225. The pin 229 is biased by the coil spring 225A in a downward direction as viewed in Fig. 8. It will be observed that the plunger 227 has attached thereto the push rod 141 which operates in a slot 231 (Fig. 9) formed in the base insulating member 75. The plunger 227 also carries an electroconductive bridging member 233 which is movable with the plunger into engagement with contacts carried by the spring arms 219 and 221. The spring arms are formed of electroconductive material and are connected through terminal screws 235 respectively to the conductors 151 and 155.

By inspection of Fig. 8, it will be observed that the coil spring 225A biases the plunger 227 out of bridging relationship with respect to the springs 219 and 221. When the push rod 141 is actuated in an upward direction, as viewed in Fig. 8, the electroconductive bridging member 233 is actuated into bridging relationship between the contacts carried by the spring arms to establish a conductive circuit between the conductors 151 and 155.

Suitable openings 237 may be provided in the base 191 for permitting passage of machine screws which are employed for attaching the base insulating member to its associated casing.

The insulating member 81 is illustrated more fully in Figs. 11, 12 and 13. This insulating member includes a top wall 239 to which the rails 85 and 87 are attached. The insulating member 81 also carries a wall 241 which extends between the rails 87 and 85. This wall contains openings 243 which permit passage of bolts employed for attaching the contact jaws such as the contact jaw 103A thereto. Conveniently, the top wall 239 is provided with ribs or keys 245 designed for reception in forked members 247 to prevent rotation of the contact jaws to which the forked members 247 are attached. The wall 241 also is provided with notches 249 and 251 for reception of L-shaped barriers 253 and U-shaped barriers 255. These barriers correspond to the barriers 207 and 209 of Fig. 8 and may be secured to the wall 241 in a similar manner by the screws employed for attaching the contact jaws to the wall 241. Partitions 257 project rearwardly from the wall 241 to space conductors which are to be connected to the contact jaws mounted on the wall 241. A plurality of threaded bushings 259 may be embedded in the insulating member 81 for reception of the machine screws 83 (Fig. 2) which are employed for attaching the insulating member to the chassis 47. If desired, additional openings 261 may be provided for receiving further attaching bolts.

The front ends of the rails 85 and 87 terminate in ears 263 of reduced thickness and height. As hereinafter pointed out, these ears are employed for guide purposes. By inspection of Fig. 12, it will be observed that the wall 241 is provided with a plurality of spaced notches 265, 266, 267 and 269. One of these notches may have a flared section 266A for guiding the tongue 208 of the base insulating member 75 (see Fig. 9) into the notch 266 when the chassis carrying the base insulating member is inserted in its associated casing. The tongue and notch facilitate the alignment of the insulating members. The notches 267 and 269 of Fig. 12 provide additional clearance for the spring blades 131 (Fig. 1) when the insulating member 81 is moved with respect thereto.

The construction and mounting of the switches on their cooperating insulating members is illustrated in Fig. 14. Fig. 14 is a sectional view through portions of the insulating members 75 and 81 to show primarily the switch blade 105 and associated parts of the switching mechanism. In Fig. 14, the switch 105 is illustrated as pivotally mounted on a forked support 275. Although the pivotal connection between the switch knife blade 105 and the forked support 275 may vary appreciably, a preferred construction, is shown in Figs. 17 and 18. As illustrated in these figures, the knife blade and forked support 275 are provided with aligned holes for receiving an internally threaded bushing 277. The threaded bushing may have a suitable head such as a hexagonal head 279 and is proportioned to receive in threaded engagement therewith a machine screw 281. A resilient locking washer 283 is provided between the hexagonal head 279 of the bushing and the adjacent face of the forked support 275. When the machine screw 281 is suitably secured to the bushing 277 with the screw head engaging the bushing and overlapping the forked support, the knife blade 105 is resiliently secured between the ends of the forked support 275. The forked support also carries female threads for receiving the threaded end 285 of a bolt 287. The bolt is provided with a hexagonal head 289 intermediate the threaded end 285 and the main threaded portion of the bolt. Consequently, the bolt 287 may be firmly secured to the forked support 275. The bolt 287 passes through one of the openings 197 of the base insulating member 75 (see Fig. 14) and is secured to the wall 195 of the base insulating member by means of a nut 291. As shown in Fig. 14, the conductor 163 may be suitably secured to the bolt 287 by means of an additional nut and washers. The spring blade 131 has an end extending between the fork support 275 and the head 289 of the bolt 287.

The knife blade 105 may have a head 105G of suitable insulating material which may be molded thereon. Conveniently the head may have a notch provided therein for the reception of a suitably colored or otherwise identified label 105H. The label may be cemented or otherwise secured to the head. To facilitate operation of the switch knife blade, the head may be roughened or provided with a plurality of minute teeth 105J as illustrated in Fig. 14.

The terminal strip 105D has an end provided with a threaded opening for reception of a threaded end 301 of a bolt 303. The bolt has a hexagonal head 305 intermediate the threaded end 301 and the main threaded portion of the bolt. Between the terminal strip 105D and the hexagonal head 305, the resilient blade 133 and the contact jaw 105A are firmly clamped. The blade 133 and the contact jaw 105A have openings permitting passage of the threaded end 301 therethrough into threaded engagement with the terminal strip 105D. Both the blade 133 and the contact jaw 105A may have forked extensions 307 and 247 for engaging one of the keys 245 provided on the insulating member 81. These forked members prevent rotation of the blade 133 and the contact jaw 105A with respect to the insulating member 81. The bolt 303 is secured to the wall 241 of the insulating member 81 in any suitable manner as by means of a nut 311. The conductor 165 may be secured to the bolt 303 in any suitable manner as by an additional nut 313 and washers. Since the bolts 287 and 303 are formed of conductive material, the conductors 163 and 165 are connected or disconnected by operation of the knife switch blade 105 and by relative movement of the blades 131 and 133.

Referring to Fig. 15, the knife blade 107 is shown mounted on the insulating member 75 in substantially the same manner discussed with reference to the switch blade 105. However, the bolt 287 employed for supporting the switch blade 107 is provided with a spacer 325. The resilient spring leaf 135 is clamped between the spacer 325 and the nut 291. If desired, a flexible electroductive lead 327 may also be clamped with the resilient spring leaf 135 and may be riveted to the contact 135A for assuring a satisfactory conductive path between the contact 135A and the bolt 287. The conductor 169 is attached to the bolt 287 in a conventional manner and consequently is electroconductively connected to the contact 135A and the switch blade 107.

The contact jaw 107A and terminal strip 107D are attached to the insulating member 81 by means of the bolt 303 in the same manner discussed with reference to the contact jaw 105A and terminal strip 105D. The bolt 303 also serves to connect the conductor 167 to the contact jaw 107A and the terminal strip 107D.

As previously explained, the back contact 107B is associated with the switch blade 107. This back contact is attached to the insulating member 75 by means of a bolt 329 which has a threaded end threadedly received in a threaded opening provided in the back contact 107B. The bolt 329 also serves to support the fixed contact 137 in the path of movement of the contact 135A. By inspection of Fig. 15, it will be observed that the bolt 329 serves to electroconductively connect the fixed contact 137 and the back contact 107B. In addition, the back contact 107B and the fixed contact 137 are connected to the blade 131 and the switch blade 105 by means of an electroconductive strap 331 (see Fig. 16).

The resilient spring leaf 135 is positioned in the path of movement of the wall 241 which is carried by the insulating member 81. When the insulating member 81 is in operative position, it engages the resilient spring leaf 135 to prevent engagement of the contacts 135A and 137.

As shown more clearly in Fig. 16, the back contact 107B is in the form of a contact jaw having contact surfaces 333 positioned to clear the associated switch blade 107 when the switch blade is in closed condition with respect to its contact jaw 107A. When the switch 107 is moved to open condition, it engages the contact surfaces 333 prior to its disengagement from the associated contact jaw 107A. When the switch blade 107 is in fully open condition (shown in broken lines in Fig. 15), as determined by the engagement of a stop 335 carried thereby with a ledge 337 provided on the base insulating member 75, the switch blade is still positioned between the contact surfaces 333 but is out of engagement with its associated contact jaw 107A. To assure such engagement between the knife blade 107 and the back contact 107B in a minimum of space, the switch blade is provided with a protuberance 339 extending toward the right as viewed in Fig. 15 and of sufficient length to assure engagement with the back contact 107B when the switch blade 107 is in its fully open condition.

As clearly shown in Fig. 15, the switch blade 107 not only has the protuberance 339 but a second protuberance 341 projecting therefrom. The purpose of the protuberance 341 is to assure entry of the switch blade into its associated contact jaw 107A initially at substantially the center of the contact jaw rather than at one edge thereof. Such a construction prevents undue wear of the edge of the contact jaw and assures smooth switch operation. All of the switch blades may be of substantially the same construction.

In order to permit interlocking of switch handles, each of the switch handles may be provided with a hole 343 extending therethrough. By extending a rod through the holes in two or more of the handles of the switch blades, the switch blades may be connected thereby for operation as a unit. For example, consider Fig. 19, wherein the switch blades 103 and 121 are connected by a rod 345 which has portions positioned in the holes 343 associated with the two switch blades. It will be recalled that the switch blades 103 and 121 in Fig. 1 occupy the end positions of the row of switch blades. Since the rod 345 is located back of the handles of the intermediate switch blades, it follows that the intermediate switch blades cannot be moved to open position until the end switch blades 103 and 121 have been moved to open position. If the end switch blades 103 and 121 are connected in the trip circuit of the relay, it follows that the intermediate switches cannot be actuated from closed to open condition until the switch blades 103 and 121 have been actuated to open the trip circuit of the associated relay.

In Fig. 20, a rod 347 is positioned in the holes 343 of the handles of the 3 switch blades 113, 115 and 117. When such a rod is provided, the three switch blades 113, 115 and 117 form a three-pole switch which must be operated as a unit. In this manner any number of switch blades may be connected together for simultaneous operation.

As previously explained, the blades 131 and 133 cooperate to form a jack. This jack is designed to receive a jack plug 351 which may be similar to that illustrated in Fig. 21. The jack plug 351 includes two electroconductive strips 353 and 354 which are separated by a ribbon 355 of insulating material. The strips and ribbon may be attached to a handle 357 in any suitable manner as by molding them into a handle formed of an insulating material, such as a phenolic resin. The strips 353 and 354 are connected within the handle respectively to conductors 359 and 361. These conductors are connected to a suitable testing or checking instrument such as an ammeter 363. It will be observed that each of the strips 353 and 354 is provided with a key 365 which is proportioned to enter the slot provided in the associated blade 133 or 131. Consequently, the keys serve to guide the jack plug between the blades and to retain the jack plug in its inserted position.

Referring to Figs. 14 and 16, it will be observed that the switch blade 105 occupies substantially the slot provided in the blades 131 and 133. Therefore, the jack plug 351 cannot be inserted effectively between the blades 131—133 until the switch blade 105 has been actuated to its open position. Such actuation of the switch blade is required to open the parallel electrical path established thereby around the jack formed by the blades 131 and 133. Conversely, the switch blade cannot be reclosed until the jack plug 351 has been removed from its associated jack.

Testing of the electrical instrument illustrated in Fig. 2 is facilitated further by the provision of a test plug 371 which is illustrated in Fig. 22. This test plug includes a plurality of electroconductive blades 373 which are spaced for reception in the contact jaws 103A to 121A of Fig. 2. These blades 373 may be embedded in a block 375 of insulation in any suitable manner as by molding the block from a suitable material such as a phenolic resin directly around a portion of the blades. Alternatively the block 371 may be preformed and slots may be cut therein for the reception of the blades 373. Each of the blades 373 has attached thereto a binding post 377 or other suitable terminal means. In the specific embodiment of Fig. 22, the binding posts 377 project at right angles from the blades 373. A cover 379 of insulating material having openings to permit passage therethrough of the binding posts is attached to the block 375 in any suitable manner as by machine screws 381.

To facilitate the guiding of the blades 373 into engagement with the contacts 103A to 121A for the purpose of testing the relay illustrated in Fig. 2, the block 375 may be provided with a pair of guide fingers 383. By inspection of Fig. 3, it will be observed that the ears 263 and 211 which are carried respectively by the insulating members 81 and 75 are spaced from each other to provide guide slots which are proportioned to receive the guide fingers 383 of the test plug 371. Consequently, when the knife blades illustrated in Fig. 3 are actuated to their open condition, the test plug 371 may have its guide fingers 383 inserted in the slots provided between the ears 211 and 263. The test plug then may be advanced to insert the blades 373 into the contact jaws to which the windings and contacts of the relay 34 are connected. It should be observed that the test plug 371 may be inserted into the contact jaws associated with the relay 34 not only when the relay is in mounted position within its casing 1, but the test plug also may be inserted in the contact jaws when the relay is removed from its casing as shown in Fig. 2.

The binding posts 377 may be suitably connected to testing or measuring instruments such as ammeters, voltmeters and wattmeters and energizing circuits for the purpose of testing the operation of the relay 34 in a manner well understood in the art. For example, to test the tripping contacts of the relay an external source of electrical energy may be connected to the end binding posts 377 through conductors 385 and 387. An ammeter 389 is located in the conductor 387 to indicate current flowing through the tripping contacts, and a voltmeter 391 is connected across the conductors 385 and 387 to indicate the voltage thereacross.

Although the invention has been described with reference to certain specific embodiments thereof, numerous modifications are possible. Therefore, the invention is to be restricted only by the appended claims as interpreted in view of the prior art.

We claim as our invention:

1. In an electrical instrument assembly, a supporting structure, electrical contact means mounted on and secured to said supporting structure, an electrical instrument supported in operative position by said supporting structure, said electrical instrument being movable from said operative position to a position displaced therefrom, electrical contact means positioned on said electrical instrument and movable therewith between said positions, a first one of said electrical contact means comprising means operable with said electrical instrument in its operative position into and out of engagement with a second one of said electrical contact means, and a cover member attachable for covering said electrical instrument, said operable means including a part positioned in the path of attachment of said cover member when said operable means is in its disengaged condition for preventing application of said cover member to cover said electrical instrument unless said operable means is substantially in its engaged condition relative to the associated contact means.

2. In an electrical instrument assembly, a supporting structure, electrical contact means mounted on and secured to said supporting structure, an electrical instrument supported in operative position by said supporting structure, said electrical instrument being movable from said operative position to a position displaced therefrom, electrical contact means positioned on said electrical instrument and movable therewith between said positions, a first one of said electrical contact means comprising means operable with said electrical instrument in its operative position into and out of engagement with a second one of said electrical contact means, and electrical connecting means effective independently of said supporting structure for operatively and separably engaging the electrical contact means positioned on said electrical instrument when said electrical instrument is in its operative position to establish separable connections between said last-named electrical contact means and circuits displaced from said electrical instrument, whereby said electrical connecting means is effective for operatively engaging the electrical contact means positioned on said electrical instrument when said electrical instrument is displaced from said supporting structure to establish separable connections between said electrical instrument and any desired electrical circuit external to the electrical instrument.

3. In an electrical instrument assembly, a plurality of switches each including male electrical contact means, and female electrical contact means for detachably receiving said male electrical contact means in male and female interleaved relationship, a supporting structure, and an electrical instrument supported in operative position by said supporting structure, said electrical instrument being movable relative to the supporting structure from said operative position to a position displaced therefrom, each of said switches including means mounting the associated contact means for relative movement into and out of male and female interleaved engagement independently of the operation of other of said switches with said electrical instrument in operative position, said mounting means including means mounting a first one of said contact means in each switch on said electrical instrument for movement therewith, and means connecting a second one of said contact means in each switch to said supporting structure.

4. In an electrical instrument assembly, a supporting structure unit, an electrical instrument unit supported by said supporting structure unit in operative position, said electrical instrument unit being movable relative to said supporting structure unit from said operative position to a position displaced therefrom, a plurality of independently operable switches each comprising jaw contact means positioned on a first one of said units, and blade contact means mounted for rotation on a second one of said units, said blade contact means and said jaw contact means cooperating to provide knife switch means operable to open and closed conditions when said electrical instrument unit is in operative position, and said electrical instrument unit together with the contact means associated therewith being movable as a unit relative to said supporting structure unit.

5. In an electrical instrument assembly, a supporting structure unit, an electrical instrument unit supported by said supporting structure unit in operative position, said electrical instrument unit being movable relative to said supporting structure unit from said operative position to a position displaced therefrom, a plurality of independently operable switches each comprising jaw contact means positioned on said electrical instrument unit, and blade contact means mounted for rotation on said supporting structure unit, said blade contact means and said jaw contact means cooperating to provide knife switch means operable to open and closed conditions when said electrical instrument unit is in operative position, and said electrical instrument unit together with the jaw contact means associated therewith being movable as a unit relative to said supporting structure unit.

6. In an electrical instrument assembly, a supporting structure, first electrical contact means mounted on said supporting structure, an electrical instrument supported in operative position by said supporting structure, said electrical instrument being movable from said operative position to a position displaced therefrom, and second electrical contact means positioned on said electrical instrument for movement therewith into engagement with said first electrical contact means in response to movement of said electrical instrument from said displaced position to said operative position, said second electrical contact means being movable out of engagement with said first electrical contact means in response to movement of said electrical instrument from said operative position to said displaced position, said two contact means being located to permit introduction of an auxiliary member therebetween when said electrical instrument is in operative position.

7. In an electrical instrument assembly, a supporting structure, electrical contact means mounted on and secured to said supporting structure, an electrical instrument supported in operative position by said supporting structure, said electrical instrument being movable from said operative position to a position displaced therefrom, and electrical contact means positioned on said electrical instrument and movable therewith between said positions, a first one of said electrical contact means comprising means operable with said electrical instrument in its operative position into and out of engagement with a second one of said electrical contact means, said contact means including terminal means accessible externally of said electrical instrument assembly when said electrical instrument is in operative position and said contact means are engaged for connecting said electrical instrument to an external circuit, whereby said electrical instrument may be connected to an external circuit without interference with the normal energization thereof.

8. In an electrical instrument assembly, a supporting structure having an opening through which an electrical instrument may be inserted from a front side of the supporting structure, an electrical instrument proportioned to pass within said opening to be supported by said supporting structure, said instrument being movable from an operative position substantially within said opening to a front position external thereto, first contact means accessible from the front of said supporting structure and positioned on said supporting structure adjacent said opening, contact jaw means positioned on said electrical instrument adjacent said first contact means when said electrical instrument is in operative position, said contact jaw means being movable with said electrical instrument relative to said supporting structure, electroconductive blade means for connecting said contact means, and means mounting said electroconductive blade means rotatably on said first contact means for operation from the front of said supporting structure into and out of engagement with the contact jaw means when said electrical instrument is in operative position relative to said supporting structure.

9. In an electrical instrument assembly, a supporting structure having an opening through which an electrical instrument may be inserted from a front side of the supporting structure, an electrical instrument proportioned to pass within said opening to be supported by said supporting structure, said instrument being movable from an operative position substantially within said supporting structure to a front position external thereto, first contact means accessible from the front of said supporting structure and positioned on said supporting structure adjacent said opening, second contact means positioned on said electrical instrument adjacent said first contact means when said electrical instrument is in operative position, said second contact means being movable with said electrical instrument relative to said supporting structure, electroconductive means for connecting said contact means, means mounting said electroconductive means rotatably on one of said contact means for rotation into and out of engagement with the other of said contact means when said electrical instrument is in operative position relative to said supporting structure, and means releasable only when said electroconductive means is disengaged from said other of said contact means for securing said electrical instrument in operative position relative to said supporting structure.

10. In an electrical instrument assembly, a supporting structure having an opening through which an electrical instrument may be inserted from a front side of the supporting structure, an electrical instrument proportioned to pass within said opening to be supported by said supporting structure, said instrument being movable from an operative position substantially within said opening to a front position external thereto, first contact means accessible from the front of said supporting structure and positioned on said supporting structure adjacent said opening, contact jaw means positioned on said electrical instrument adjacent said first contact means when said electrical instrument is in operative position, said contact jaw means being movable with said electrical instrument relative to said supporting structure, electroconductive blade means for connecting said contact means, and means mounting said electroconductive blade means rotatably on said first contact means for rotation into and out of engagement with the contact jaw means when said electrical instrument is in operative position relative to said supporting structure, and releasable latch means for securing said electrical instrument in operative position relative to said supporting structure, said electroconductive blade means including means interlocked with said latch means to permit release of said latch means only when said electroconductive blade means is disengaged from said contact jaw means.

11. In an electrical instrument assembly, a supporting structure having an opening through which an electrical instrument may be inserted from a front side of the supporting structure, an electrical instrument proportioned to pass within said opening to be supported by said supporting structure, said instrument being movable from an operative position substantially within said opening to a front position external thereto, first contact means accessible from the front of said supporting structure and positioned on said supporting structure adjacent said opening, second contact means positioned on said electrical instrument adjacent said first contact means when said electrical instrument is in operative position, said second contact means being movable with said electrical instrument relative to said supporting structure, electroconductive means for connecting said contact means, said electroconductive means being movable from the front side of said supporting structure from a position connecting said contact means to a position disconnecting said contact means when said electrical instrument is in operative position, and releasable latch means for securing said electrical instrument to said supporting structure, said latch means and said electroconductive means including interlocked parts permitting release of said latch means only when said electroconductive means is in disconnecting position relative to said contact means, and said interlocked parts permitting movement of said electroconductive means to connecting position with said electrical instrument in operative position only when said latch means is in latching position.

12. In an electrical instrument assembly, a supporting structure having an opening through which an electrical instrument may be inserted from a front side of the supporting structure, an electrical instrument proportioned to pass within said opening to be supported by said supporting structure, said instrument being movable from an operative position substantially within said opening to a front position external thereto, first contact means accessible from the front of said supporting structure and positioned on said supporting structure adjacent said opening, second contact means positioned on said electrical instrument adjacent said first contact means, when said electrical instrument is in operative position, said second contact means being movable with said electrical instrument relative to said supporting structure, electroconductive means for connecting said contact means, said electroconductive means being movable from the front side of said supporting structure from a position connecting said contact means to a position disconnecting said contact means when said electrical instrument is in operative position, and releasable latch means for securing said electrical instrument to said supporting structure, said latch means and said electroconductive means including interlocked parts permitting release of said latch means only when said electroconductive means is in disconnecting position relative to said contact means, said interlocked parts permitting movement of said electroconductive means to connecting position only when said latch means is in latching position, and a cover for said opening, said electroconductive means having a part positioned in the path of attachment of said cover when said electroconductive means is in disconnecting position for permitting movement of said cover to closed position over said opening only when said electroconductive means is substantially in connecting position relative to said contact means.

13. In an electrical instrument assembly, a supporting structure, an electrical instrument supported in operative position by said supporting structure, said electrical instrument being movable from said operative position to a position displaced therefrom, and a plurality of pairs of electrical contact means; each of said pairs of contact means including a first contact element mounted on said supporting structure, a second contact element positioned on said electrical instrument for movement therewith between said positions, one of the contact elements in each of said pairs of contact means including means operable independently of the remainder of said pairs into and out of engagement with the associated contact element, and terminal means for each of said contact elements, each of said terminal means being located in a position accessible externally of said electrical instrument assembly when said electrical instrument is in operative position for facilitating the electrical connection of each of said contact means to an external circuit.

14. In an electrical instrument assembly, a supporting structure having an opening through which an electrical instrument may be inserted from a front side of the supporting structure, an electrical instrument proportioned to pass within said opening to be supported by said supporting structure, said instrument being movable from an operative position substantially within said opening to a front position external thereto, first contact means accessible from the front of said supporting structure and positioned on said supporting structure adjacent said opening, second contact means positioned on said electrical instrument adjacent said first contact means when said electrical instrument is in operative position, said second contact means being movable with said electrical instrument relative to said supporting structure, electroconductive means operable for connecting and disconnecting said contact means, and terminal means permanently connected to each of said contact means, each of said terminal means being located in a position individually visible and accessible from the front of said supporting structure when said electrical instrument is in operative position for facilitating connection of each of said contact means independently to an external circuit.

15. In an electrical instrument assembly, a supporting structure having an opening through which an electrical instrument may be inserted from a front side of the supporting structure, an electrical relay instrument proportioned to pass within said opening to be supported by said supporting structure, said instrument being movable from an operative position substantially within said opening to a front position external thereto, and said instrument having control contacts for controlling an external circuit, first contact means accessible from the front of said supporting structure and positioned on said supporting structure adjacent said opening, second contact means positioned on said electrical relay instrument adjacent said first contact means when said electrical relay instrument is in operative position, said second contact means being movable with said electrical relay instrument relative to said supporting structure and being connected to electrical parts of said relay instrument including said control contacts, said contact means being arranged in a plurality of pairs wherein each pair includes a first contact means and a second contact means, and separate electroconductive means associated with each of said pairs, each of said electroconductive means being disposed for operation from the front of said supporting structure when said electrical relay instrument is in operative position for connecting and disconnecting the associated pair of contact means independently of the other contact means.

16. In an electrical instrument assembly, a supporting structure having an opening through which an electrical instrument may be inserted from a front side of the supporting structure, an electrical instrument proportioned to pass within said opening to be supported by said supporting structure, said instrument being movable from an operative position substantially within said opening to a front position external thereto, first contact means accessible from the front of said supporting structure and positioned on said supporting structure adjacent said opening, second contact means positioned on said electrical instrument adjacent said first contact means when said electrical instrument is in operative position, said second contact means being movable with said electrical instrument relative to said supporting structure, said contact means being arranged in a plurality of pairs wherein each pair includes a first contact means and a second contact means, separate electroconductive means associated with each of said pairs, each of said electroconductive means being disposed for operation from the front of said supporting structure when said electrical instrument is in operative position for connecting and disconnecting the associated pair of contact means independently of the other contact means, separate terminal means for each of said contact means visible and accessible from the front of said supporting structure for facilitating connection of external conductors to said contact means, and cover means detachably secured over said opening for covering said electrical instrument, said contact means, said electroconductive means and said terminal means.

17. In an electrical assembly, a first insulating member, a second insulating member engaging said first insulating member for sliding movement with respect thereto from an operative position to a position displaced therefrom, a separate electrical circuit element secured to each of said insulating members, and switch means including first and second contact elements for detachably connecting said circuit elements, means mounting said first contact element on said first insulating member, means mounting said second contact element pivotally on said second insulating member for rotation relative thereto into and out of engagement with said first contact element when said second insulating member is in operative position, and means connecting each of said circuit elements to a separate one of said contact elements, whereby said circuit elements may be detachably electrically connected, and said insulating members may be detachably mechanically connected, by said switch means.

18. In an electrical assembly, a first insulating member, a second insulating member engaging said first insulating member for sliding movement with respect thereto from an operative position to a position displaced therefrom, a separate electrical circuit element secured to each of said insulating members, and switch means including first and second contact elements for detachably connecting said circuit elements, means mounting said first contact element on said first insulating member, means mounting said second contact element pivotally on said second insulating member for rotation relative thereto into and out of engagement with said first contact element when said second insulating member is in operative position, said contact elements being configured for movement from disengagement to full engagement with each other by a thrusting actuation of one of said contact elements relative to the other of the contact elements, and means connecting each of said circuit elements to a separate one of said contact elements, whereby said circuit elements may be detachably electrically connected, and said insulating members may be detachably mechanically connected, by said switch means.

19. In an electrical assembly, a first insulating member, a second insulating member engaging said first insulating member for sliding movement with respect thereto from an operative position to a position displaced therefrom, a separate electrical circuit element secured to each of said insulating members, and a plurality of switch means individually operable for connecting said circuit elements; each of said switch means including a first contact element providing a resilient jaw, a second contact element providing a knife blade designed for reception in said resilient jaw, means mounting said first contact element on said first insulating member, means mounting said second contact element pivotally on said second insulating member for rotation relative thereto into and out of engagement with said first contact element when said second insulating member is in operative position, and means connecting each of said circuit elements to a separate one of said contact elements, whereby said circuit elements may be detachably electrically connected, and said insulating members may be detachably mechanically connected, by said switch means.

20. In an electrical assembly, a casing having an opening, a first insulating member in said casing, a second insulating member in said casing engaging said first insulating member for sliding movement with respect thereto from an operative position through said opening to a position displaced therefrom, a separate electrical circuit element secured to each of said insulating members, and a plurality of switch means individually operable for connecting said circuit elements; each of said switch means including a first contact element providing a resilient jaw, a second contact element providing a knife blade designed for reception in said resilient jaw, means mounting said first contact element on said first insulating member, means mounting said second contact element pivotally on said second insulating member for rotation relative thereto into and out of engagement with said first contact element when said second insulating member is in opertive position, means connecting each of said circuit elements to a separate one of said contact elements, whereby said circuit elements may be detachably electrically connected, and said insulating members may be detachably mechanically connected, by said switch means, a cover for said opening to complete an enclosure for said insulating members and switch means, and means securing said cover detachably over said opening to provide access to said second contact elements by removal of said cover.

21. In an electrical assembly, a casing having an opening, a first insulating member in said casing, a second insulating member in said casing engaging said first insulating member for sliding movement with respect thereto from an operative position through said opening to a position displaced therefrom, a separate electrical circuit element secured to each of said insulating members, and a plurality of switch means individually operable for connecting said circuit elements; each of said switch means including a first contact element providing a resilient jaw, a second contact element providing a knife blade designed for reception in said resilient jaw, means mounting said first contact element on said first insulating member, means mounting said second contact element pivotally on said second insulating member for rotation relative thereto into and out of engagement with said first contact element when said second insulating member is in operative position, means connecting each of said circuit elements to a separate one of said contact elements, whereby said circuit elements may be detachably electrically connected, and said insulating members may be detachably mechanically connected by said switch means, a cover for said opening to complete an enclosure for said insulating members and switch means, separate terminal means connected to each of said contact elements, said terminal means being located within said enclosure in positions accessible when said cover is removed to permit connection of external conductors to said terminal means, and means securing said cover detachably over said opening to provide access to said second contact elements by removal of said cover.

22. In an electrical assembly designed for establishing a connection between two portions of an electrical circuit and designed for reception of a jack plug, a jack comprising a first insulating member, a second insulating member mounted for movement with respect to said first insulating member from an operative position to a position displaced therefrom, a first contact element positioned on said first insulating member, and a second contact element positioned on said second insulating member to engage said first contact element when said second insulating element is in operative position, said second contact element moving out of engagement with said first contact element in response to movement of said second insulating element from operative position, said contact elements when engaged being accessible to permit separation thereof by insertion of a jack plug therebetween, at least one of said contact elements being of resilient contruction.

23. In an electrical assembly for establishing an electrical connection between two relatively movable parts, a first insulating member, a second insulating member mounted for movement with respect to said first insulating member from an operative position to a position displaced therefrom, switch means comprising a first contact element disposed on said first insulating member, a second contact element disposed on said second insulating member, and means mounting one of said contact elements on the associated insulating member for movement into and out of engagement with the other of said contact elements when said second insulating member is in operative position, a jack comprising a first contact member on said first insulating member, and a second contact member on said second insulating member, said contact members being positioned adjacent each other to provide a jack when said second insulating member is in operative position, means electrically connecting said first contact element to said first contact member, and means electrically connecting said second contact element to said second contact member, whereby said jack is connected across said switch means.

JAMES F. CHAPMAN.
KOLMAN RIESZ.